United States Patent Office 3,751,536
Patented Aug. 7, 1973

3,751,536
MICROPOROUS MEMBRANES
Guy Bourat, Bourg-la-Reine, and Albert Fabre, Lyon, France, assignors to Rhone-Poulenc S.A., Paris, France
No Drawing. Filed Aug. 4, 1971, Ser. No. 169,115
Claims priority, application France, Aug. 7, 1970, 29,297
Int. Cl. B29d 27/04
U.S. Cl. 264—47                           8 Claims

ABSTRACT OF THE DISCLOSURE

The invention provides a microporous opaque polyvinyl chloride membrane having a porosity between 40 and 85%, the pores having a diameter of less than 1μ.

---

The present invention relates to microporous membranes based on polyvinyl chloride (PVC).

The membranes of this invention are microporous opaque PCV membranes having a porosity between 40 and 85%, preferably between 50 and 80%, the pores having a diameter less than 0.1μ. (The diameters of the pores are measured by observing the surface of the membranes under the electron microscope.)

The "porosity" as used herein is defined as the $$\text{number}\left[100\times\left(1-\frac{\text{weight of the porous membrane}}{\text{weight of a membrane of the same size but free of pores}}\right)\right]$$

The membranes may be reinforced by a grid such as a woven fabric or netting. The porosity defined above is, in this case, computed by replacing the weight of the membrane by the difference between the weight of the membrane reinforced with the grid, and the weight of the grid.

The membranes of this invention generally have a substitution resistance (measured as described in French Pat. No. 1,584,187) of less than 1 Ω·cm.² if they are not reinforced with a grid, and less than 5 Ω·cm.² if they are reinforced with a grid. They are, therefore, suitable for use as compartment separators in electricity generators, especially accumulators and fuel piles.

The membranes of this invention can also be used in ultrafiltration by virtue of their ability to separate macromolecules as a function of their molecular weight, the molecular weight limit between macromolecules which pass through and macromolecules which cannot pass across the membranes being at about 40,000 to 70,000.

The thickness of the membranes naturally varies according to the nature of the application for which they are intended; it is however usually between 30 and 360μ.

The membranes may be prepared, according to the invention, by leaching a film consisting of an essentially homogeneous mixture of PVC and of poly-para(dialkylamino)styrene (hereafter referred to as PPDMAS). The latter plays the role of a pore-forming agent. The alkyl radicals generally have 1 to 4 carbon atoms.

By "leaching" as used herein is meant the process of extracting from a solid body certain soluble components by means of an appropriate solvent.

The film is preferably prepared by casting a solution of PVC and of PPDMAS in a joint solvent, and then evaporating the solvent. Typical such solvents include cyclic ketones such as cycloehxanone and cyclopentanone, ethers such as tetrahydrofurane, aprotic polar solvents such as dimethylformamide, and acetone/carbon disulphide mixtures.

The proportion by weight of PPDMAS employed in the PVC/PPDMAS mixture is usually between 85 and 40% by weight, preferably between 80 and 50%.

The PVC used desirably has an AFNOR viscosity index (measured according to Standard specification AFNOR T-51013) of between 50 and 450, preferably between 70 and 200. The molecular weight of PPDMAS is generally between 1,000 and 20,000, preferably between 1,500 and 3,000.

The PVC/PPDMAS mixture can optionally contain other constituents, such as plasticisers, especially known plasticisers for PVC such as non-volatile esters, in particular alkyl phthalates, especially butyl phthalate and octyl phthalate, tricresyl phosphate and octyl azelate. These plasticisers can be present in the PVC/PPDMAS mixture in proportions ranging up to about 20%. Before leaching the PPDMAS, the plasticisers can optionally be leached beforehand, for example with a lower aliphatic alcohol. We have found that, in practice, the extraction of the PPDMAS does not change the dimensions of the membranes.

The films consisting of PVC and of PPDMAS, prepared according to the process just described (before leaching) are generally transparent, at least in the wet state. The leaching of the PPDMAS is usually carried out by immersing the films in the leaching agent, or by washing the films with the agent. In a continuous process, the films can be passed as an endless strip through a bath consisting of the leaching agent.

The leaching agent for the PPDMAS should be a solvent for the PPDMAS and a non-solvent for the PVC. An aqueous acidic solution, for example of hydrochloric, sulphuric or phosphoric acid, is advantageously used. The concentration of the acid leaching solution is generally between 0.05 N and 5 N, preferably between 0.2 N and 2 N.

The temperature at which the leaching is carried out is usually ambient temperature. It is however possible to carry out the process at temperatures ranging from, for example 0° C. to 80° C. The leaching is advantageously followed by washing with water to remove any acidic remains.

The preparation of grid-reinforced membranes may be carried out by leaching a grid-reinforced film of PVC/PPDMAS. Such a film can itself be obtained by the usual methods of coating grids. The grid-reinforced membranes may contain from 30 to 90% (w./w.), preferably from 60 to 80%, of PVC.

The process of this invention is particularly suitable for continuous opertion; in effect, it is possible to cast the PVC/PPDMAS solution on a drum or a belt, evaporate the solvent by heating or by ventilation and then pass the film obtained first into the PPDMAS leaching bath (optionally preceded by a bath for leaching the plasticisers), then into the wash bath and finally into a drying apparatus.

An advantage of the process of this invention is that it is possible to extract the pore-forming agent practically completely; this is important both in fuel piles and in the ultrafiltration of biological liquids such as suspensions of bacteria, because in these techniques it is important that the use of the membranes should not result in contamination by remains of pore-forming agent which can only be leached out over a long period; such contamination can in effect deactivate the fuel pile catalysts or change the condition of the bacteria.

The following examples further illustrate the present invention.

EXAMPLE 1

The following were successively dissolved in 70 g. of cyclohexanone, with stirring:

at 60° C., 6 g. of PVC (AFNOR viscosity index=100), and at 23° C., 24 g. of PPDMeAS (molecular weight about 1,900)

(PPDMeAs is used to denote poly-para-dimethylaminostyrene).

This solution was cast on a glass plate so as to form a liquid film 0.2 mm. thick. The cyclohexanone was evaporated in an oven at 70° C. and the film obtained was immersed for 24 hours in a bath of 0.5 N aqueous hydrochloric acid provided with a liquid circulator. After washing with distilled water until the chloride ions had disappeared in the wash waters, an opaque membrane having a pore diameter of less than $0.1\mu$ and a substitution resistance of 0.2 $\Omega$ . cm.$^2$ was obtained. It contained no elementary nitrogen. Water covering one face of the membrane under a relative pressure of 0.05 bar passed through this membrane at a flow rate of 48 mm.$^3$/min. cm.$^2$.

The membrane was furthermore used in an ultrafiltration operation on an aqueous solution containing 0.5 g./l. of albumin and 9 g./l. of NaCl, the pressure being 2 bars; with albumin of average molecular weight 70,000, no albumin was noted in the ultrafiltrate. With albumin of average molecular weight 45,000, it was found that at the end of the operation the ultrafiltrate contained 25% by weight of the albumin employed.

EXAMPLE 2

The following were successively dissolved in 1000 g. of cyclohexanone, with stirring:

at 60° C., 125 g. of PVC(AFNOR viscosity index=100)
at 23° C., 350 g. of PPDMeAS (molecular weight about 2000).

12.5 g. of octyl phthalate were then added and the whole was heated at 70° C. for 1 hour. The solution was left to stand for 15 hours so as to allow any trapped bubbles of air to escape.

A grid-reinforced membrane was then prepared as follows. A $75\mu$ thick polyamide woven fabric consisting of $35\mu$ diameter fibres, and weighing 26 g. per square metre, was immersed in the solution prepared above, dried, again immersed in the same solution and again dried.

The octyl phthalate was extracted by immersion in methanol for 2 hours at 23° C. The film obtained was still transparent. The PPDMeAS was extracted by immersion for 24 hours in a leaching bath consisting of an 0.5 N aqueous solution of HCl, the bath being provided with a liquid circulator.

After washing with distilled water until chloride ions had disappeared in the wash waters, an opaque membrane was obtained, the pores of which had a diameter of less than $0.01\mu$; its resistance was 0.2 $\Omega \cdot$ cm.$^2$. The elementary nitrogen content corresponded exactly to the amount of nitrogen present in the grid.

Water covering one face of the membrane under a relative pressure of 0.05 bar passed through this membrane at a flow rate of 0.012 cm.$^3$/min. cm.$^2$.

The membrane was furthermore used in an ultrafiltration operation on an aqueous solution containing 10 g./l. of albumin of average molecular weight 60,000 and 9 g./l. of sodium chloride. Under a relative pressure of 2 bars, the flow rate of ultrafiltrate was 0.06 cm.$^3$/min. cm.$^2$, and the albumin content of the material which has permeated was 1 g./l.

EXAMPLE 3

Example 2 is repeated using 500 g. rather than 350 g., of PPDMeAS.

An opaque membrane, the pores of which had a diameter of less than $0.1\mu$, was obtained; its substitution resistance was 0.3 $\Omega \cdot$ cm.$^2$. It contained no elementary nitrogen.

The flow rate of water under a relative pressure of 0.05 bar was 0.14 cm.$^3$/min. cm.$^2$.

In an ultrafiltration operation carried out as in Example 2, but under a relative pressure of 1 bar, an aqueous solution containing 2 g./l. of albumin was collected at a flow rate of 0.04 cm.$^3$/min. cm.$^2$.

EXAMPLE 4

Example 2 was repeated, replacing the aqueous solution containing 10% of albumin and 9 g./l. of NaCl with an aqueous solution containing 0.5 g./l. of $\gamma$-globulin (molecular weight: 150,000) and 9 g./l. of NaCl.

No $\gamma$-globulin was observed in the ultrafiltrate.

We claim:

1. A process for preparing a microporous opaque polyvinyl chloride membrane having a porosity between 40 and 85%, the pores having a diameter of less than $0.1\mu$, which comprises leaching a mixture of polyvinyl chloride and a poly-para(dialkylamino)styrene.

2. A process according to claim 1 wherein the mixture is leached with an aqueous acidic solution.

3. A process according to claim 1 wherein the mixture is prepared as a film by casting a solution of the polymers in a common solvent.

4. A process according to claim 3 wherein the common solvent is cyclohexanone, cyclopentanone, tetrahydrofurane, dimethylformamide or an acetone/carbon disulphide mixture.

5. A process according to claim 1 which is carried out continuously.

6. A process according to claim 1 in which the membrane is reinforced with a grid.

7. A process according to claim 6 in which the membrane is reinforced with a woven fabric or netting.

8. A process according to claim 1 in which the membrane has a thickness from 30 to $360\mu$.

References Cited

UNITED STATES PATENTS

| 3,216,882 | 11/1965 | Feldt et al. | 161—109 |
| 3,450,631 | 6/1969 | Bloch et al. | 210—22 |

FRANK A. SPEARS, JR., Primary Examiner

U.S. Cl. X.R.

210—490, 500; 264—45, 49